(12) United States Patent
Lewis

(10) Patent No.: US 7,701,510 B2
(45) Date of Patent: Apr. 20, 2010

(54) MENU GENERATION FOR MPEG COMPLAINT DEVICES

(75) Inventor: Richard Lewis, Buffalo Grove, IL (US)

(73) Assignee: Zenith Electronics LLC, Lincolnshire, IL (US)

( * ) Notice: Subject to any disclaimer, the term of this patent is extended or adjusted under 35 U.S.C. 154(b) by 1062 days.

(21) Appl. No.: 11/388,637

(22) Filed: Mar. 24, 2006

(65) Prior Publication Data

US 2007/0223594 A1 Sep. 27, 2007

(51) Int. Cl.
*H04N 7/00* (2006.01)
*H04N 5/50* (2006.01)

(52) U.S. Cl. ...................... 348/465; 348/569

(58) Field of Classification Search ........... 348/465, 348/569, 468, 178; 725/38, 39, 51, 131, 725/136, 137, 139, 151; 370/466
See application file for complete search history.

(56) References Cited

U.S. PATENT DOCUMENTS

| | | | |
|---|---|---|---|
| 6,184,878 B1 * | 2/2001 | Alonso et al. .............. 725/109 |
| 6,557,031 B1 * | 4/2003 | Mimura et al. .............. 709/218 |
| 6,747,983 B1 * | 6/2004 | Knutson et al. ............. 370/412 |
| 6,810,090 B1 * | 10/2004 | Perlow ....................... 375/301 |
| 7,248,590 B1 * | 7/2007 | Liu .......................... 370/395.64 |
| 7,386,013 B1 * | 6/2008 | Beser ......................... 370/477 |
| 2002/0007494 A1 * | 1/2002 | Hodge ........................ 725/109 |
| 2004/0181800 A1 * | 9/2004 | Rakib et al. .................. 725/25 |
| 2005/0028224 A1 * | 2/2005 | Liu et al. .................... 725/136 |

* cited by examiner

*Primary Examiner*—Victor Kostak

(57) ABSTRACT

An on-screen display is generated for an MPEG compliant receiver. Externally of the MPEG compliant receiver, an MPEG transport stream is accessed, first data in the accessed MPEG transport stream is replaced with second data that relates to the data to be provided in the on-screen display, and the MPEG transport stream with the second data is remodulated as an RF signal. The RF signal is forwarded to the MPEG compliant receiver. The first data can be close caption data, and the second data can be installation and/or configuration menu data.

19 Claims, 1 Drawing Sheet

MENU GENERATION FOR MPEG COMPLAINT DEVICES

TECHNICAL FIELD OF THE INVENTION

The present invention relates to the generation of menus, such as installation and/or configuration menus, in connection with MPEG compliant devices.

BACKGROUND OF THE INVENTION

The Moving Pictures Experts Group (MPEG) has adopted a body of standards that relates to the digitization of video and audio and that covers a wide variety of compression techniques. Devices that are compliant with the MPEG standards include VHS players, DVDs, telephones, digital cameras, and satellite, terrestrial, and cable receivers such as digital televisions and high definition televisions, etc.

Many of these devices generate installation and/or configuration menus to perform custom set-up. In typical situations where the configuration program has access to the MPEG decoder of the MPEG compliant device, a simple on-screen display can be generated by interacting with the graphics overlay capability of the MPEG decoder. However, in the case of a remote control device or a device that only has access to the compressed MPEG stream, the generation of on-screen displays becomes a much more difficult undertaking because no overlay capability is available.

The present invention relates to the generation of on-screen displays when the compressed MPEG stream but not the MPEG decoder of an MPEG compliant device is available.

SUMMARY OF THE INVENTION

According to one aspect of the present invention, a method of generating installation and/or configuration menus for on-screen display on a receiver comprises the following: externally of the receiver, accessing an MPEG transport stream; externally of the receiver, replacing close caption data in the accessed MPEG transport stream with menu data to provide a modified MPEG transport stream; externally of the receiver, remodulating the modified MPEG transport stream as an RF signal; and, forwarding the RF signal to the receiver.

According to another aspect of the present invention, a system that generates installation and/or configuration menus for on-screen display on a receiver comprises an input, a menu generator, and a remodulator. The input receives an MPEG transport stream, and the input is external of the receiver. The menu generator replaces close caption data in the MPEG transport stream with menu data to produce a modified MPEG transport stream, and the menu generator is external of the receiver. The remodulator remodulates the modified MPEG transport stream as an RF signal and forwards the RF signal to the receiver, and the remodulator is external of the receiver.

According to yet another aspect of the present invention, a method of generating an on-screen display for an MPEG compliant receiver comprises the following: externally of the MPEG compliant receiver, accessing an MPEG transport stream; externally of the MPEG compliant receiver, replacing first data in the accessed MPEG transport stream with second data so as to produce a modified MPEG transport stream, wherein the second data relates to the data to be provided in the on-screen display; externally of the MPEG compliant receiver, remodulating the modified MPEG transport stream as an RF signal; and, forwarding the RF signal to the MPEG compliant receiver.

BRIEF DESCRIPTION OF THE DRAWINGS

These and other features and advantages will become more apparent from a detailed consideration of the invention when taken in conjunction with the drawings in which.

DETAILED DESCRIPTION

As discussed above, many remote control devices and/or other devices that only have access to the compressed MPEG stream are not capable of generating on-screen displays. Such devices would require an encoding function so as to permit them to interact with the MPEG compressed stream in order to generate on-screen displays. The present invention allows the functionality of such devices to be modified in order to permit menus such as used during installation and/or configuration to be displayed.

Figure 1:
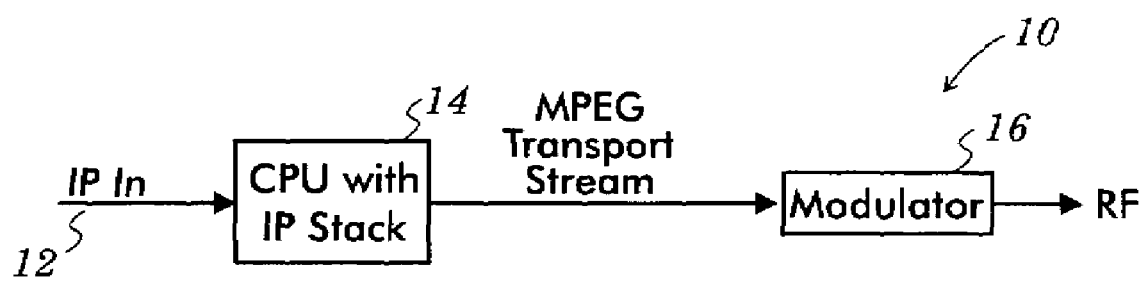
FIG. 1 illustrates an IP to VSB transponder for an MPEG compliant device.

FIG. 1 shows an example device that only has access to the compressed MPEG stream and that is not capable of generating on-screen displays. This specific example device is an IP (Internet Protocol) to VSB (Vestigial Sideband) transponder 10 for providing a VSB output to an MPEG compliant device which may be, for example, in the form of a digital television.

The IP to VSB transponder 10 receives an IP signal on an input 12 and includes a CPU 14 that strips away the Internet Protocol formatting so as to reduce the IP signal to the MPEG transport stream that is contained in the IP signal. In other words, the CPU 14 strips away the Internet Protocol formatting from the input IP signal leaving only the MPEG packets that are output from the CPU 14 as the MPEG transport stream. Accordingly, the MPEG transport stream is available for processing as described below.

The IP to VSB transponder 10 further includes a VSB modulator 16 that receives the MPEG transport stream and that modulates the MPEG transport stream as a VSB signal for supply over a selected RF channel to an RF input of a receiver (not shown).

Figure 2:
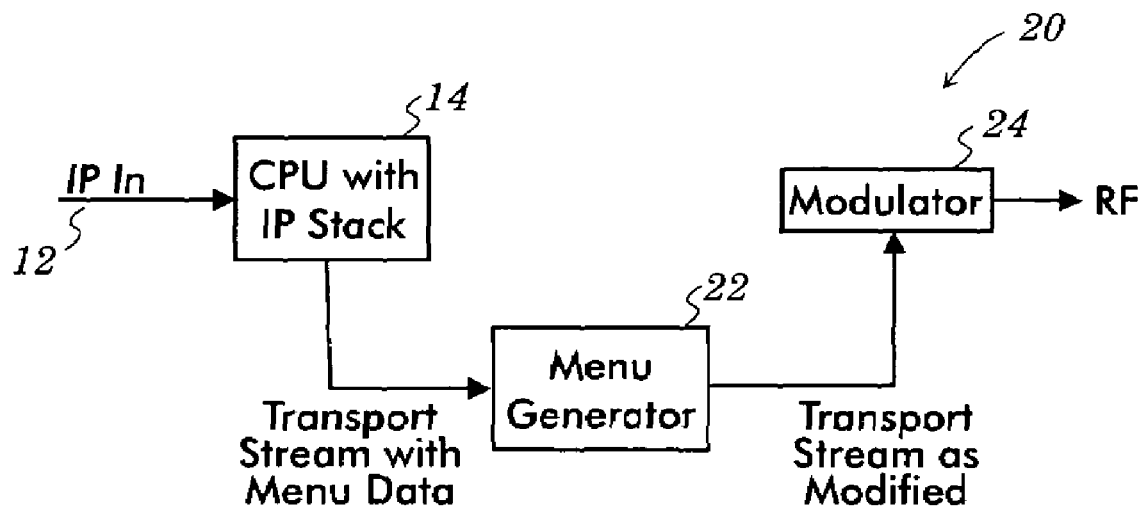
FIG. 2 illustrates modification of the IP to VSB transponder of FIG. 1 in accordance with an embodiment of the present invention.

FIG. 2 shows the manner in which the functionality of the IP to VSB transponder 10 of FIG. 1 can be supplemented in order to produce a menu generation system 20 that generates on-screen displays useful, for example, during installation and/or configuration of the receiver to which the menu generation system 20 supplies its RF output. The menu generation system 20 receives an IP signal on the input 12 and includes the CPU 14 that strips away the Internet Protocol formatting so as to convert the IP signal to an MPEG transport stream, as before.

The menu generation system 20 includes a menu generator 22 that receives the MPEG transport stream from the CPU 14. As shown in FIG. 2, the transport stream includes packets containing menu data. Alternatively, the menu data can be supplied by the CPU 14 or the menu generator 22 itself. The transport stream also includes packets including close caption data. These menu and close caption packets are identified by corresponding PIDs. The menu generator 22 detects the menu data packets as well as close caption packets based on their corresponding PIDs and replaces the data in the close caption packets with the data in the menu packets. The menu generator 22 forwards the MPEG transport stream with the menu data in place of the close caption data to a VSB modulator 24.

The VSB modulator 24 receives the MPEG transport stream and modulates it as a VSB signal for supply over a selected RF channel to an RF input of a receiver. The receiver receives the menu data in the close caption packets and decodes this data as if it were close caption data, which it then processes normally so that menu data appears on-screen, such as during installation and/or configuration of the receiver.

Thus, the functionality required to provide installation and/or configuration menus to a receiver is accomplished externally of the receiver requiring no alteration of the receiver itself.

Certain modifications of the present invention have been discussed above. Other modifications of the present invention will occur to those practicing in the art of the present invention. For example, the invention has been described above in the context of a digital television compliant with the ATSC Digital Television standard that uses VSB modulation. However, the present invention is applicable to other devices that use other modulation techniques.

Moreover, the transponder as described above is useful in converting a signal from an Internet Protocol to an output suitable for use by a receiver. The present invention is also useful in any other device in which the MPEG transport stream is accessible for the overlaying of on-screen displays as described above.

Furthermore, the on-screen displays that are generated can be displays other than menus.

Additionally, the present invention as described above replaces close caption data with menu data for supply to a receiver. However, the present invention can be used to replace any convenient data in the MPEG transport stream with any other data to be provided as an on-screen display on the receiver.

Also, as described above, the menu generator 22 replaces close caption packets with the menu data packets received in the MPEG transport stream. As indicated above, however, the menu generator 22 can instead use menu packets stored in a memory coupled to the menu generator 22, or the menu generator 22 can use menu packets supplied by some other apparatus.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of generating installation and/or configuration menus for on-screen display on a receiver comprising:
    externally of the receiver, accessing an MPEG transport stream;
    externally of the receiver, replacing close caption data in the accessed MPEG transport stream with menu data to provide a modified MPEG transport stream;
    externally of the receiver, remodulating the modified MPEG transport stream as an RE signal; and,
    forwarding the RE signal to the receiver.

2. The method of claim 1 wherein the accessing of an MPEG transport stream comprises reducing an IP formatted signal to the MPEG transport stream.

3. The method of claim 1 wherein the accessing of an MPEG transport stream comprises converting an input signal to the MPEG transport stream.

4. The method of claim 1 wherein the remodulating of the MPEG transport stream comprises VSB remodulating the MPEG transport stream.

5. The method of claim 4 wherein the accessing of an MPEG transport stream comprises reducing an IP formatted signal to the MPEG transport stream.

6. The method of claim 4 wherein the accessing of an MPEG transport stream comprises converting an input signal to the MPEG transport stream.

7. A system that generates installation and/or configuration menus for on-screen display on a receiver comprising:
    an input that receives an MPEG transport stream, wherein the input is external of the receiver;
    a menu generator that replaces close caption data in the MPEG transport stream with menu data to produce a modified MPEG transport stream, wherein the menu generator is external of the receiver; and,
    a remodulator that remodulates the modified MPEG transport stream as an RF signal and forwards the RF signal to the receiver, wherein the remodulator is external of the receiver.

8. The system of claim 7 wherein the input comprises an IP reformatter that reformats an IP signal as the MPEG transport stream.

9. The system of claim 7 wherein the input comprises a converter that converts an input signal to the MPEG transport stream.

10. The system of claim 7 wherein the remodulator comprises a VSB remodulator.

11. The system of claim 10 wherein the input comprises an IP reformatter that reformats an IP signal as the MPEG transport stream.

12. The system of claim 10 wherein the input comprises a converter that converts an input signal to the MPEG transport stream.

13. A method of generating an on-screen display for an MPEG compliant receiver comprising:
    externally of the MPEG compliant receiver, accessing an MPEG transport stream;
    externally of the MPEG compliant receiver, replacing first data in the accessed MPEG transport stream with second data so as to produce a modified MPEG transport stream, wherein the second data relates to the data to be provided in the on-screen display;
    externally of the MPEG compliant receiver, remodulating the modified MPEG transport stream as an RF signal; and,
    forwarding the RF signal to the MPEG compliant receiver.

14. The method of claim 13 wherein the first data comprises close caption data.

15. The method of claim 13 wherein the second data comprises installation and/or configuration menu data.

16. The method of claim 15 wherein the first data comprises close caption data.

17. The method of claim 1 wherein the method is implemented by a device having no MPEG decoder.

18. The system of claim 7 wherein the system includes no MPEG decoder.

19. The method of claim 13 wherein the method is implemented by a device having no MPEG decoder.

* * * * *

UNITED STATES PATENT AND TRADEMARK OFFICE
CERTIFICATE OF CORRECTION

PATENT NO. : 7,701,510 B2  Page 1 of 1
APPLICATION NO. : 11/388637
DATED : April 20, 2010
INVENTOR(S) : Richard Lewis It is certified that error appears in the above-identified patent and that said Letters Patent is hereby corrected as shown below:

In column 3, lines 57 and 58 (claim 1), please correct RE to RF.

Signed and Sealed this

Eighth Day of June, 2010

David J. Kappos
*Director of the United States Patent and Trademark Office*